March 18, 1969  C. F. LATTER  3,433,434

FILAMENT WINDING MACHINE

Original Filed June 4, 1965

INVENTOR
CHARLES F. LATTER

BY- Fetherstonhaugh & Co.
ATTORNEYS

March 18, 1969     C. F. LATTER     3,433,434

FILAMENT WINDING MACHINE

Original Filed June 4, 1965     Sheet 4 of 5

INVENTOR
CHARLES F. LATTER
BY- *Fetherstonhaugh & Co*
ATTORNEYS

United States Patent Office 3,433,434
Patented Mar. 18, 1969

3,433,434
FILAMENT WINDING MACHINE
Charles F. Latter, Brampton, Ontario, Canada, assignor to Philip D. Rosengarten, Montreal, Quebec, Canada
Continuation of application Ser. No. 470,262, June 4, 1965. This application Jan. 26, 1967, Ser. No. 612,030
U.S. Cl. 242—158                                            5 Claims
Int. Cl. B65h 54/28

ABSTRACT OF THE DISCLOSURE

A filament winding machine wherein a filament is wound to a predetermined form on a mandrel and means are provided for simultaneously rotating the mandrel and carrying the filament across the mandrel in a filament winder head, in which the means for controlling the movement of the filament winder head in traverse and dwell with respect to the rotation of the mandrel is achieved by means of a pulse motor that moves a predetermined positive amount for each pulse of power applied thereto and the supply of power pulses for the motor is keyed to the rotation of the mandrel.

---

This is a continuation of application Ser. No. 470,262, filed June 4, 1965 now abandoned.

This invention relates to a filament winding machine.

The art of winding filaments onto a mandrel for the purpose of making tubular and like components has been highly developed over the past number of years. In the filament winding method of fabricating reinforced plastic parts from glass fibres the general method is to wet glass filaments with a resin, continuously wind them upon a mandrel of desired shape and then cure the resin. The ends of fibres must be accurately tensioned and accurately wound on the mandrel. The accuracy with which the ends of fibres must be wound has contributed to the complication and, therefore, cost of filament winding apparatus.

In a usual machine the mandrel rotates and the fibre is fed onto the rotating mandrel from a head that traverses the mandrel. It will be apparent that the rate of speed with which the head traverses the mandrel must be accurately controlled with respect to the rate of turning of the mandrel, and that if successive layers of wound fibre are to lay adjacent the previously wound layer, an appropriate dwell of the head must be provided for at each complete traverse of the mandrel. In the past, complicated gear arrangements have been used to achieve these ends.

It is an object of this invention to provide a simple but precise filament winding machine capable of accurately winding a filament on a mandrel with which it is possible to provide all of the required control of the winding head with respect to the mandrel.

Generally speaking, a filament winding machine, according to this invention, comprises a frame having a mandrel mounted for rotation thereon and a filament winder head. Means are provided for rotating the mandrel and operating means are provided for operating the winder head with respect to the mandrel which include traverse means for causing the winder head to incrementally traverse the mandrel. The incremental movement of the traverse means is an important feature of the invention because it is due to the incremental movement that is provided for that the required accuracy can be achieved. Programming means are provided for dictating the operation of the traverse means. The programming means include signal, transmitting means which, according to the invention, are operable by the power train that rotates the mandrel. In this way, the operation of the filament winder head and the mandrel are effectively and accurately keyed together so that they are dependent upon each other.

The programming means which dictates the movement of the operating means does, as indicated, have signal transmitting means operable by the power train that rotates the mandrel and can be arranged to control any movement of the winder head with respect to the mandrel, including traverse, dwell and plunge.

The invention will be clearly understood after reference to the following detailed specification read in conjunction with the drawings.

Figure 1:
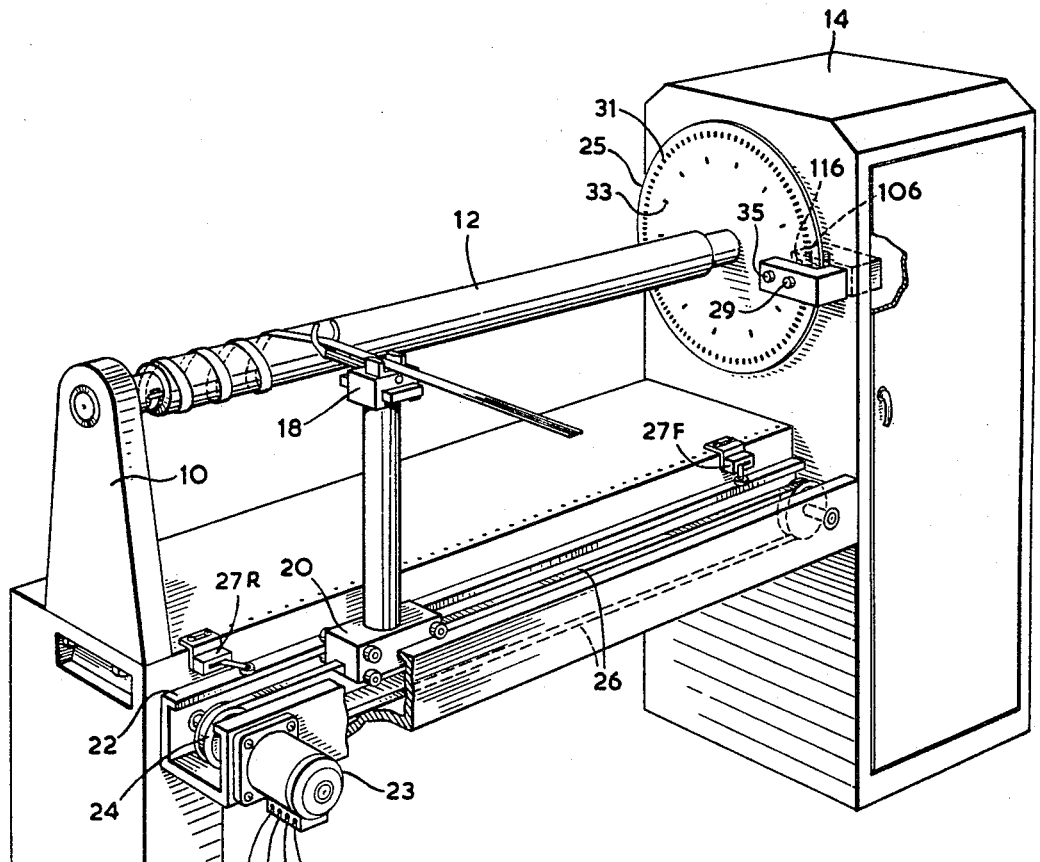
FIGURE 1 is a view of a filament winding machine according to this invention.
Figure 2:
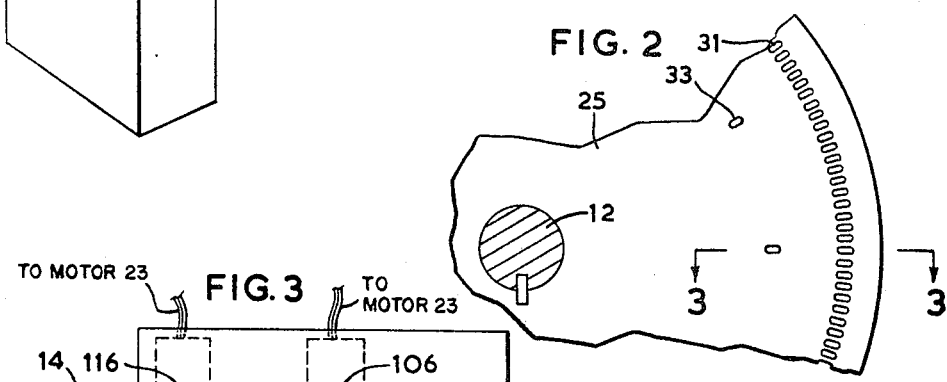
FIGURE 2 is a fragmentary section of a programming disk.
Figure 3:
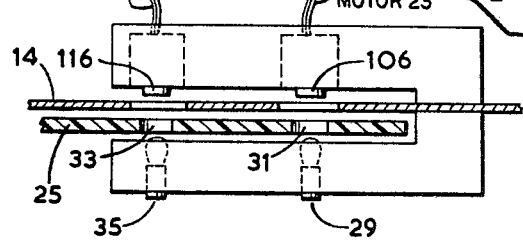
FIGURE 3 is a fragmentary sectional view illustrating the operation of the signal transmitting means of the programming means that dictates the movement of the traverse means.
Figure 11:
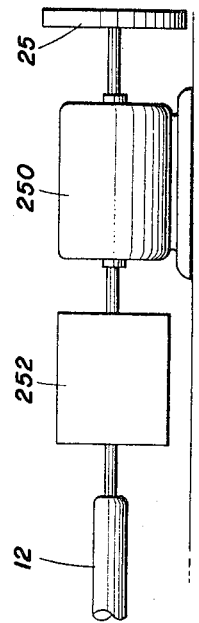
Figure 12:
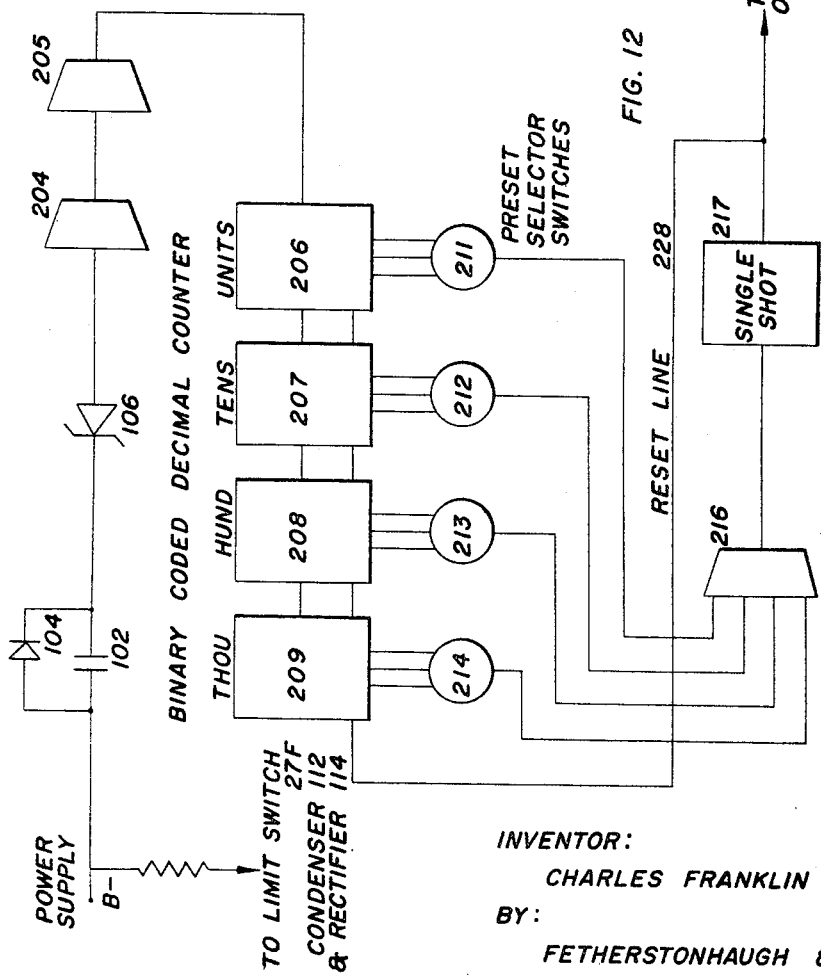
Figure 13:
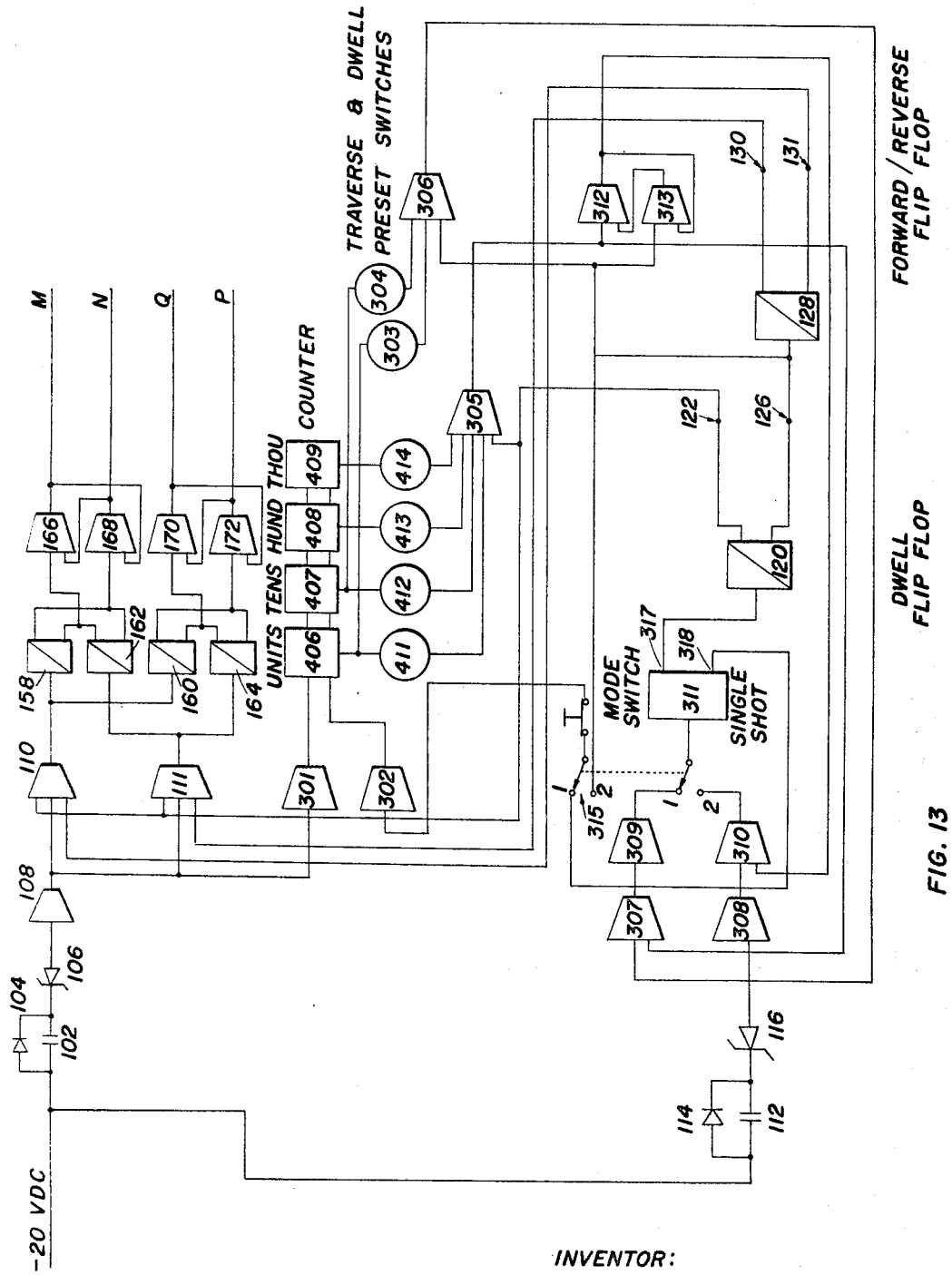
Figure 8:
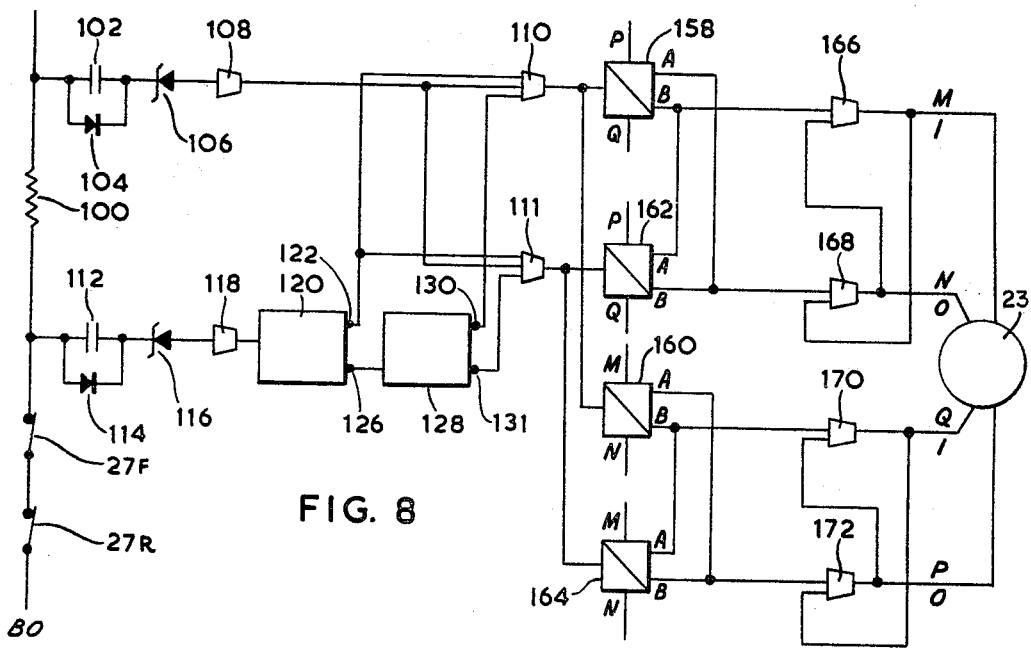
Figure 9:
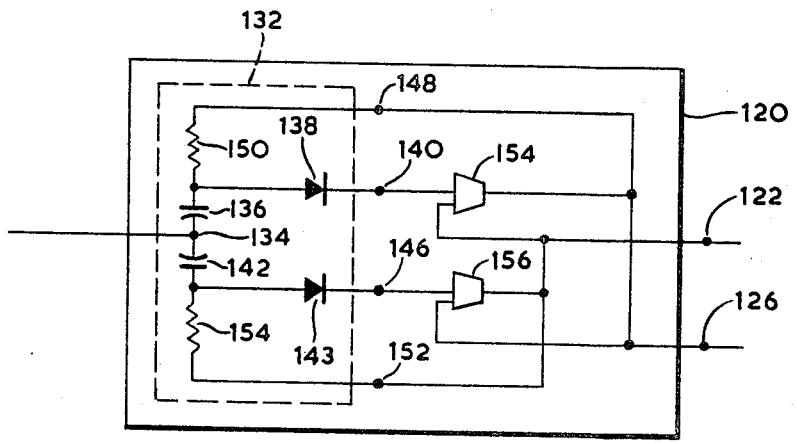
Figure 10:
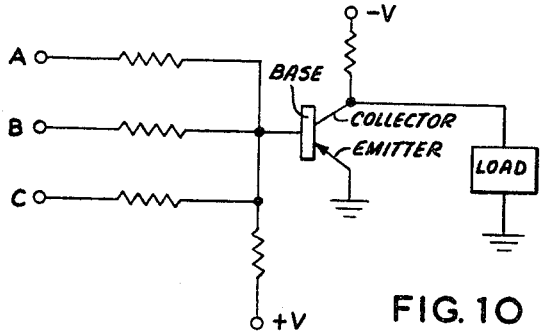

In FIGURE 8 is shown the control circuit for controlling the movement of the filament winder head in accordance with rotation of the mandrel;

FIGURE 9 shows a detail of one of the elements of FIGURE 8;

FIGURE 10 shows a typical NOR element used in the specific embodiment;

FIGURE 11 shows an alternative form for some of the elements described in relation to FIGURE 1;

FIGURE 12 shows an alternative form for some of the controls shown in FIGURE 8; and FIGURE 13 shows an alternative form for others of the controls shown in FIGURE 8.

In the drawings, the numeral 10 generally refers to a filament winder. It comprises a frame 10 within which is rotatably mounted a mandrel 12. The cabinet 14 houses the motor for driving the mandrel and the other control equipment for the machine.

A filament winder head 18 is mounted on a carriage 20, which in turn rides on the track 22 to traverse the mandrel as dictated by the operation of a traverse means, which includes the electric motor 23, the output pulley 24 of which drives the belt 26 that connects with the carriage of the filament winder head. It will be noted that the belt passes around an idler roller at the opposite end of the track to the end where the motor is mounted.

It will be apparent that if the filament winder head is caused to traverse the mandrel as the mandrel rotates, an end of filaments fed through the winder head will be wound on the mandrel as is well known in the art According to this invention, the motor operates incrementally to carry the filament winder head across the mandrel, and for a given pulley it is in fact by varying the incremental motor movements per revolution of the mandrel that the helix angle of the winding can be varied. This will be apparent later in the specification.

Programming means are provided for dictating the movement of the traverse motor to control the helix winding angle and the dwell time at the end of each traverse as is necessary in accurate filament winding. The programming means includes a signal transmitting means in the form of a disk 25 carried by the mandrel and operable to transmit signals as the mandrel rotates to actuate the motor.

The disk 25 is rigidly mounted on the mandrel and has a series of annularly arranged, equally spaced apart holes 31 therearound, which are adapted to pass through a beam of light emanating from a bulb 29 and directed to a light activated switch 106. As the holes 31 in the series pass over the bulb 29 in turn, a beam of light is transmitted to the light activated switch. The light so transmitted to the light activated switch actuates a control circuit to supply a pulse of power to the motor and move the motor a positive increment. It will be apparent that by providing more or less holes 31 in the annularly arranged track that the motor is pulsed more or less per revolution of the mandrel, with the result that the speed of the filament winder head can be increased or decreased by varying the number of holes.

It will be apparent also that provision must be made for dwell of the traverse means at the end of each traverse of the winder head across the mandrel in order that each successive end of filament that is wound lays adjacent to or disposed in a predetermined pattern to the preceding winding. For this purpose the programming means includes a second series of annularly arranged holes 33 spaced inwardly of the first series, and means for rendering the signalling holes of the first series inoperative while adjacent holes on the second series pass their respective signal pick-up light from a bulb 35 to a light activated switch 116.

It will be noted that the holes of the dwell signal transmitting series are spaced apart considerably, and it is the spacing of these holes that controls the time of the dwell. These dwell controlling holes are rendered operative as the carriage strikes either one of the limit switches 27F or 27R at the end of its horizontal travel. Thus, as the carriage moves to the right, it strikes the limit switch 27F and operates the limit switch. Following operation of the limit switch 27F, the next signal hole of the dwell controlling series that passes the signal light sends a beam to the light sensitive switch 116, which in turn operates the control circuit to cancel out the operation of the control holes that supply pulses to drive the motor, whereby the filament winder head stops or dwells. When the next succeeding hole in the dwell control series passes the light beam, a signal is transmitted to the light sensitive switch to again render operative the motor control holes and cause the motor to again incrementally move the filament winder head across the mandrel. As it does so, the limit switch 27F is reset. A similar operation takes place at the other side of the machine.

Figure 4:
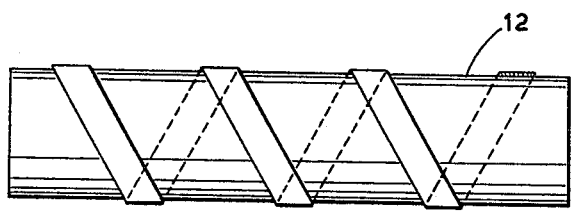
FIGURES 4, 5, 6 and 7 are views illustrating the winding of an end on a mandrel and the calculation of the dwell time at the end of each traverse
Figure 4A:
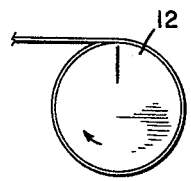
FIGURES 4A, 5A, 6A and 7A are end views of FIGURES 4, 5, 6 and 7 respectively.
Figure 5:
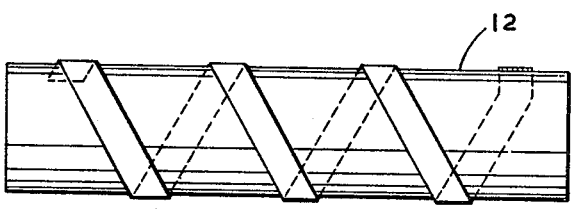
Figure 5A:
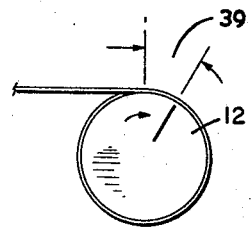
Figure 6:
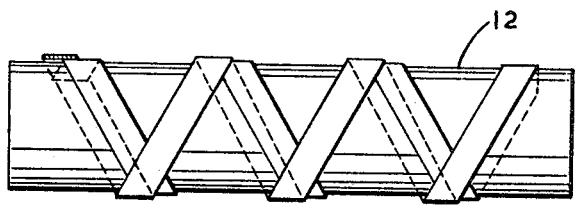
Figure 6A:
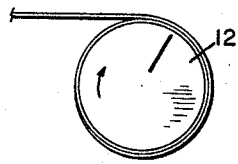
Figure 7:
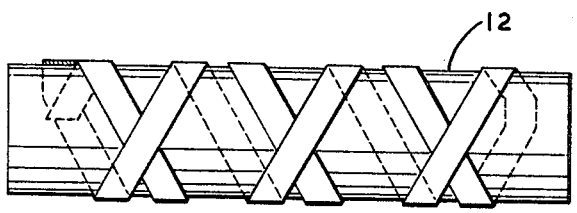
Figure 7A:
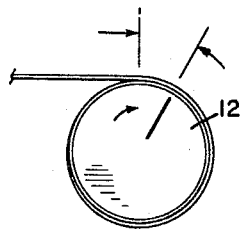

The need for dwell is illustrated in FIGURES 4 to 7. These figures show the mandrel from the front and from one end. In FIGURE 4 an end of filaments has been wound on the mandrel and the carriage has hit the limit switch. At this stage, the outer series of holes which dictate the traverse motion of the winder head are rendered inoperative and the winder head dwells as the mandrel continues to rotate. The dwell is indicated at the numeral 39 in FIGURE 5. After a predetermined amount of dwell, the series of holes that dictate dwell terminate the dwell and again renders the outer series that dictate traverse operative, with the result that the filament winder head again travels across the mandrel to lay a row of filament in the opposite direction. FIGURE 6 shows the mandrel as the limit switch is operated at the opposite end of the winder head travel. At this stage, the inner series of holes that dictate dwell again go into operation as before and provide for a dwell of the winder head before it again traverses the mandrel, so that when the traverse begins the end that is laid down on the mandrel will lie adjacent to the previously wound filament on the previous traverse of the mandrel in that direction.

The dwell at each end is the same and is a function of the helix angle and end or ribbon. Assume, for example, a helix angle such that the filament ribbon dimension at right angles to the longitudinal axis of the mandrel is 1/6 of the roll diameter; in such a case the dwell expressed in degrees of rotation of the mandrel at both ends of the mandrel must be 1/6 of 360°, that is, 60° in order that successive layers of filament ribbon in the same direction will lie adjacent to each other. If the dwell is split evenly between the two ends, it must occur for 30° of rotation of the mandrel at each end. Thus, to achieve the required dwell, as illustrated in FIGURES 4 to 7, the holes in the dwell dictating series are 30° apart.

From the foregoing, it will be apparent that the invention provides for the effective and simple keying of the movement of the filament winder head to the movement of the mandrel. The series of holes effectively program the operation of the winder head with respect to the mandrel. In the embodiment of the invention illustrated, there are two series of signal transmitting holes, which control the traverse motion and dwell states of the traverse head. It will be apparent that an additional series of signal transmitting holes could be included capable of moving the head towards and away from the mandrel on an appropriate track for the purpose of controlling the "plunge" of the head with respect to the track. In this way it would be possible to wind shapes other than tubular. This concept of plunge is well know in the art, and it is thought that further reference to it in this specification is not necessary, the invention being essentially the provision of a programming means tied to the operation of the power train that rotates the mandrel and that includes signal transmitting means as set forth herein. The control circuit employed is of significance and following is a description thereof.

In the control circuit (FIGURES 8–10) a negative D.C. source is connected through a resistance 100 through limit switches 27F and 27R in series to zero potential.

The negative D.C. source is connected through a condenser 102 and rectifier 104 in parallel to a light activated switch 106 (preferably of the silicon type). The condenser 102 is oriented to conduct when the potential at the negative source is higher than the potential at the light activated switch 106. The light activated switch 106 is selected to have sharp "cut off" and "cut in" levels, to give a sharp transition to conductivity when illuminated to the desired level and a sharp transition to substantial non-conductivity when not illuminated above such level. The switch 106 is connected to a positive potential source through NOR logic element 108, to be discussed, and is arranged to be activated when the light from bulb 29 shines through one of the holes 31 on the switch 106 which is aligned therewith, and to be non-activated at other times.

The switch 106 remote from the negative source is connected to form the input of the NOR logic element 108. The output of NOR element 108 is connected to form one of the three inputs for NOR elements 110 and 111.

In FIGURE 10 is shown a typical NOR logic element used in several places in the preferred embodiment. It will be appreciated that with the negative collector biasing and the positive base biasing of the PNP transistor used, that the provision of an input to any or all of A, B or C moves the transistor base negative (called here a signal "1") providing a collector output of zero (called here "0"). On the other hand, if at any time there is no input on any of A, B or C, i.e., all are "0," the output will be negative, i.e. "1." It will be seen that the operation would be the same if, instead of three, there were one or two inputs. Such, or an equivalent element, is used at elements 110 and 111 and wherever the same symbol is used.

The resistance 100 remote from the negative D.C. source is connected through a condenser 112 and rectifier 114 in parallel to a light activated switch 116. The condenser 112 is oriented to conduct when the potential at the junction between the resistance 100 and switch 27F is higher than the potential at the switch 116. The switch 116 is similar in design to switch 106. The light activated switch 116 is arranged and located to be activated when the light from bulb 35 shines through one of the holes 33 and to be non-activated at other times.

The switch 116 remote from the negative source is connected to form the input of the NOR logic element 118. The output of the NOR element 118 is connected to form the input for a steering flip-flop circuit 120, shown in detail, in FIGURE 9 and effective to control the "dwell." The flip-flop circuit 120 has output 122 connected to form an input for each of NOR elements 110 and 111 and an output 126 connected to form an input for a steering flip-flop 128 having output terminal 130 connected to form one input for NOR element 110 and an output terminal 131 connected to form one input for NOR element 111, this steering flip-flop being effective to control whether the traverse of the winding head 18 is forward or back.

The flip-flop 120 is illustrated in FIGURE 9. The output of NOR logic element 118 is connected to the input of a transfer element 132 comprising a common input terminal 134 connected through a condenser 136 and rectifier 138 to an output terminal 140 with the rectifier oriented to conduct from positive to negative from input toward output terminal. Input terminal 134 is identically connected through a condenser 142 and rectifier 143 to an output terminal 146. A control terminal 148 is connected through a resistor 150 to the connection between condenser 136 and rectifier 138. A control terminal 152 is connected through a resistor 154 to the connection between condenser 142 and rectifier 153. In its mode of operation when a negative voltage is applied at input terminal 134, while both control terminals 148 and 152 are held at 0 volts, a pulse of positive potential will be emitted from the outputs 140 and 146 when the input signal returns from negative to 0 volts, i.e., from "1" to "0." No signal is obtained from the outputs when the input level changes from 0 to the minus voltage, i.e. "1," and (counting negative voltage as "1" and zero voltage as "0," as is done herein) only when the input signal changes from 1 to 0 can an output be produced.

No output will be produced at output terminal 140 when gate 148 is at 1 (i.e. negative operating voltage), even when the input signal changes from 1 to 0. Similarly, no output will be produced at output terminal 146 when terminal 152 is at 1.

Output terminal 140 forms one input of NOR logic element 154, and output terminal 146 forms one input of NOR logic element 156. The output of NOR logic element 154 is connected to (a) the control terminal 148, (b) a second input to NOR logic element 156 and (c) to output terminal 126. The output of NOR logic element 156 is connected to (a) the control terminal 152, (b) to form a second input to NOR logic element 154, and (c) to the output 122.

In the NOR logic elements shown herein in the specific embodiment, an output (design) negative voltage (referred to as "1") is produced when all the inputs are zero "0," and zero output "0" is produced when one or more of the inputs are at the (design) negative voltage (referred to as "1"). Accordingly, with an initial state of an output at terminal 122 as 0 and an output at terminal 126 as 1, it will be seen that in the absence of an input at terminal 134 the 0 output at 122 is applied to the input of NOR element 154, allowing its output (i.e. that of terminal 126) to remain at 1 and the output at 126 is applied to the input of NOR element 156, causing its output (i.e. that of terminal 122) to remain at 0. Thus the circuit will remain in this state in the absence of an input. When an input signal, i.e. going from 0 to 1, is received at terminal 134, no resultant output is produced at terminals 140 or 146. When the signal returns the potential from 1 to 0, then a positive pulse is produced at output 146 because control terminal 152 (like output terminal 122) is at 0. However, no pulse is produced at output 140 because terminal 148 (like output terminal 126) is at 1. The result of the positive pulse at output 146 is to switch off NOR logic element 156 during the duration of the pulse. (Since in the preferred embodiment the transistors for the NOR logic elements are of the PNP variety, the NOR element 156 is conducting (output 0) at the time of the positive pulse and since the positive pulse is designed to be of sufficient magnitude to achieve such switching.) When NOR logic element 156 is switched off, the output is switched to 1 which is applied to the second input of NOR element 154 switching its output to 0 which in turn is applied to the input of NOR element 156. At the cessation of the positive pulse therefore, both inputs of NOR element 156 are 0, maintaining the output at 1, and the second input of NOR element 154 is 1, maintaining the outputs at 0. Thus the outputs 122 and 126 have been switched from 0 to 1 and 1 to 0 respectively, and the terminals 152 and 148 have been switched from 0 to 1 and 1 to 0 respectively, and in the absence of a further signal at terminal 134 matters remain in this state due to the interlocking of the NOR elements 154 and 156. When a further signal is received at terminal 134 going 0 to negative (0 to 1), nothing happens, and when the signal goes negative to zero (1 to 0) the positive pulse is produced at terminal 140 but not at terminal 146 due to the then state of the control terminals 148 and 150. The positive pulse at 140 switches off NOR element 154 causing a 1 output, switching on NOR element 156 causing a 0 output, the terminals 148, 152, 122 and 126 return to their original state and are retained in this position by the interlocking of the NOR elements until a further positive pulse is received.

The operation and construction of steering flip-flop 128 is the same as that of steering flip-flop 120, hence with a signal 1 on terminal 131 and a signal 0 on terminal 130, when terminal 126 goes from 1 to 0, the output of steering flip-flop 128 is switched to provide an output 1 at terminal 130 and an output 0 at terminal 131. The steering flip-flop 128 locks in this position, remains unchanged when terminal 126 switches from 0 to 1, and the output at terminals 130 and 131 will only again be interchanged when the terminal 126 again switched from 1 to 0.

The outputs of NOR elements 110 and 111 are connected to a steering circuit as now described. The output of NOR element 110 is connected to the inputs of transfer elements 158 and 160. The output of NOR element 111 is connected to the input of transfer elements 162 and 164. The transfer elements 158–160–162–164 are identical in operation to transfer element 132, although the outputs and controls will here be differently wired. Output A of transfer element 158 and output B of transfer element 162 are connected to form one input of NOR element 168. Output B of transfer element 158 and output A of transfer element 162 are connected to form one input of NOR element 166. Similarly outputs 160A and 164B are connected to NOR logic element 172 and outputs 160B and 160A are connected to NOR logic element 170.

The outputs M and N of respective NOR elements 166 and 168 are respectively applied to each other's inputs. The outputs Q and P of respective NOR elements 170 and 172 are respectively applied to each other's inputs.

The outputs M, N, Q, P are applied to the control terminals respectively as follows:

Output:
    M _____ Connected to 160M and 164M.
    N _____ Connected to 160N and 164N.
    Q _____ Connected to 158Q and 162Q.
    P _____ Connected to 158P and 162P.

In operation with the outputs M, N, Q, P being initially 1, 0, 1, 0, signals 0 to 1 will have no effect but the reciprocal signal 1 to 0 from NOR element 110 will provide a positive pulse at 158A (158P at 0) and at 160B (160N at 0) but no such pulse at 158B or 160A (158Q=1, 160M=1). The pulse at 158A will switch NOR element 168 output N to 1 and through the interlock to NOR element 166 will switch the output M to 0, reversing, it will be noted, the state of the control terminals for transfer elements 160 and 164. The pulse at 160B has no effect on NOR element 170 (or on control terminals of transfer element 158 or 162) as its only possible effect could be to switch element 170 off (output 1) but this element is already off. Thus, the M, N, Q, P outputs 1, 0, 1, 0 have been switched to 0, 1, 1, 0.

Analogous operation when the next 1 to 0 change is received from NOR element 110 will switch the M, N, Q, P outputs to 0, 1, 0, 1. The sequence of outputs for a series of signals (1 to 0) from NOR element 110 is

| Signal | 1 | 2 | 3 | 4 | 5 |
|---|---|---|---|---|---|
| M | 1 | 0 | 0 | 1 | 1 |
| N | 0 | 1 | 1 | 0 | 0 |
| Q | 1 | 1 | 0 | 0 | 1 |
| P | 0 | 0 | 1 | 1 | 0 |

The signals from NOR elements 110 and 111 are never simultaneously received in the operation of the device to be described since one of terminals 130 or 131 is always at 1 while the other is at 0.

Examination of the circuitry will make it obvious that a series of signals from NOR element 111 will switch the outputs M, N, Q, P in the reverse of the above sequence i.e.

| Signal | 1 | 2 | 3 | 4 | 5 |
|---|---|---|---|---|---|
| M | 1 | 1 | 0 | 0 | 1 |
| N | 0 | 0 | 1 | 1 | 0 |
| Q | 1 | 0 | 0 | 1 | 1 |
| P | 0 | 1 | 1 | 0 | 0 | and so on.

These outputs M, N, Q, P are applied to the input of a synchronous motor 23 of a type such as "Bifilar Slo-Syn" (trademark) manufactured by the American Superior Electric Company, and the sequences above provide for rotation in forward or reverse direction, depending on which sequence is used and hence on whether signals are received from NOR element 110 or 111. This motor is a very positive acting high torque motor capable of accurate incremental movement when pulsed. The motor turns 360° in 200 increments. It will not move except by one of these increments. It is by this incremental movement that the precision of the machine is achieved.

The motor 23 is connected in accordance with its direction of rotation to move the winder head 18 in one direction or the other across the mandrel 12, the drive being such that the axial movement of the winder head 18 along the mandrel 12 is proportional to the angular rotation of the mandrel since the motor 23 is designed so that each switching sequence outlined above advances it through an equal rotational increment and the motor 23 is connected to drive winder head 18 through an equal translational increment.

In operation, with the winder head 18 midway across the mandrel, the output of steering flip-flop 120 on terminal 122 is 0 to both NOR elements 110 (forward winder head movement) and 111 (reverse winder head movement). The output on terminal 126 is 1 and as a starting condition, the output on terminal 130 will be assumed 0 and on terminal 131, 1. As each flash of light through an (outer) hole 31 strikes switch 106 it causes the charging of condenser 102, causing a drop at the base of the transistor for the NOR element 108, providing an output pulse value 0 therefrom during the duration of the pulse. This output is applied to NOR elements 110 and 111. At the same time, both limit switches 27F and 27R are closed, and since the condenser 112 is connected on both sides to 0 voltage, no signals will appear at NOR element 118 due to the activation of switch 116 from light shining through inner holes 33. The output of NOR element 118 will therefore be 1, and it will be understood that this is arranged at this time to provide through the steering flip-flop 120 an output 0 on line 122 and an output 1 on line 126. At this time, the steering flip-flop 128 will—with such input 1—be arranged to provide a signal 0 on line 130 and a signal 1 on line 131.

During the duration of the 0 output from NOR element 108, there is 0 input on all three lines to NOR element 110 and a pulse 1 is sent to transfer elements 158 and 160, causing operation of the motor 23 in accordance with the "forward" sequence to move the winder head 18 incrementally axially along the mandrel 12, and such movement will continue in the same sense as the holes 31 sequentially appear before bulb 29 to allow light to fall on light activated switch 106.

The output signals 0 from NOR element 108 will be supplied simultaneously to NOR element 111, but no output will be received from the latter in view of the persisting input 1 thereto from terminal 131.

The movement of the winder head 18 across the mandrel 12 will continue across the mandrel 12 until the winder mount opens one of the limit switches 27F or 27R (depending on which end of the mandrel travel has been reached) (say 27F). This effectively switches in the NOR element 118 ready for activation of switch 116 (since the junction of resistance 100 to condenser 112 is now at negative potential). Movement of the winder head 18 in the original direction, under the control of light through outer holes 31 in disk 25, however, continues until one of the inner holes 33 becomes aligned, in rotation of the mandrel, with bulb 35 and switch 116. This causes a 1 (negative) input to NOR element 118 and an 0 output from NOR element 118 for the same interval. The duration of the negative input is controlled by the size and charging rate of capacitors 102 and 112. Thus the duration of the signal is independent of disk speed. The disk controls only the number of pulses received, one for each hole. The resultant 1 to 0 change at the input to transfer flip-flop 120 switches on a 1 output on terminal 112 and a 0 output on terminal 126.

The 1 output from terminal 122 to NOR elements 110 and 111 effectively prevents operation of motor 23, stopping movement of winder head 18 and initiating the "dwell" period.

The change from 1 to 0 on terminal 126 switches the outputs 130 and 131 to 1 and 0 respectively.

When the next inner hole 33 in the disk 25 aligns with bulb 35 and switch 116, a further pulse from NOR element 118 switches the output of steering flip-flop 120 to provide 0 on terminal 122 to NOR elements 110 and 111. Simultaneously, terminal 126 goes from 0 to 1, but in accordance with the design of steering flip-flop 128, this does not alter the flip-flop 128 outputs.

Thus, the input of NOR element 110 after the second activation of switch 116 has a 1 input from terminal 130 and the input of NOR element 111 has a 0 input from terminals 131 and 122. Thus, when the next outer holes 33 sequentially align with switch 106 during mandrel rotation, the resultant 0 signal from NOR element 108 goes to NOR elements 110 and 111, having no effect on the output of element 110 due to the continued existence of the 1 signal from terminal 130 to the input thereof, but produces an output from NOR element 111, actuating motor 23 in the reverse sequence to begin to move the winder head 18 in the opposite direction along the mandrel 12 (ending the dwell period).

Thus the winder head 18 has been axially stationary for the time interval between the two successive activations of switch 116, which occurred when the limit switch 27F is open, although the mandrel has been continuously rotating. Thus the spacing of inner holes 33 on the disk 25 sets the "dwell" period.

As the winder head 18 moves away from one end of the mandrel 12 in the opposite direction, the limit switch 27F is again allowed to close, effectively shorting out the circuit controlled by light activated switch 116, and in accord with the design, this occurs before a further inner hole 33 aligns with switch 116. Thus the inner holes 33 have no more effect on the operation of the circuitry until a limit switch is again opened. Thus the reverse travel of the winder head 18 will continue under the successive activations by outer holes 31 on switch 106 until the winder head 18 opens (at the other end of the desired mandrel travel), the other limit switch 27R.

This switches in the circuit controlled by switch 116, which on the first activation initiate the dwell period and reverses the outputs 130 and 131 to ready the NOR elements 110 and 111 to allow switch 106 to cause, through NOR element 110, movement in the orignal direction on termination of the dwell period. The next activation of switch 116 ends the dwell period, whereby the next activation of switch 106 causes movement of the winder head 18 in the original direction; hence movement of the winder head away from the limit switch 27R causes it to reclose, cutting out the circuit otherwise activated by switch 116.

The winder head thus travelling in the original direction and the circuitry are in the state as originally described and the cycle described will be repeated as often as possible.

Embodiments of the invention other than the one illustrated will be apparent to those skilled in the art. For example, a plurality of series of signal transmitting holes or the like could be included on the single disk shown and appropriate switching means included for charging from one series to the other to achieve different winding patterns. Added elements such as a power drive for the incrementally driven motor could be added for large machines if necessary. Moreover, while the invention has been illustrated as filament winder, it will be apparent that it could be used for machine tool control generally, the machine tool being moved in accordance with the movement of the workpiece.

In an alternative form of the invention, more flexibility can be achieved, in the rate of advance of the winder head, by driving the disc at a rate which is a multiple of that of the mandrel. The higher rate of light pulses incident on a light sensitive switch may then be divided by a controllable divisor so that the number of light switch pulses per electronic pulse for advancing the winder head may be controlled.

In FIGURE 11 is shown a schematic view of the device wherein the mandrel 12 (compare with FIGURE 1) is driven at a reduced rate by the motor 250 through a speed reducer 252 having any desired reduction ratio (say 20:1). The disc 25 is however directly driven from the shaft of the motor 250. Since the mandrel will be driven at the same speed as before, the disc will in fact be driven at 20 times the speed of the embodiment in FIGURE 1 and hence with the same disc, 20 times as many pulses are obtained on the light sensitive switch 116, (the switch and bulbs being of course relocated to cooperate with the disc).

Shown in FIGURE 12 is circuitry to electronically operate on the higher rate pulses received by light sensitive switch 106. Thus in FIGURE 12 the elements whose numbers are higher than 200 would be located between elements 106 and 108 on FIGURE 8, the remainder of FIGURE 8 remaining the same in the alternative embodiment.

In FIGURE 12, therefore, the pulses from light sensitive switch 106 are directed initially to a frequency divider circuit. The number of pulses, which appear at the input of the circuit, would be divided by the setting of a digitally adjustable preset switch 209–206 to provide more or less pulses per revolution of the mandrel. Thus, the speed of the winder head can be increased or decreased by various settings of the switch. This provision eliminates the need for providing separate discs 25, each with different numbers of holes 31 to accomplish the desired programming for various winding patterns and product shapes or sizes. The circuitry for accomplishing this feature is shown in FIGURE 12.

The operation of elements 104, 102 and 106 is as already described in relation to FIGURE 8. NOR elements 204 and 205 are wave shaping and amplifier circuits, providing reliable signals to the digit binary coded decimal counter elements 206 (units) 207 (tens) 208 (hundreds), and 209 (thousands). The circuitry for these elements is standard and compatible with the NOR elements which are used throughout the control and which are well known to those familiar with the state of the art. Special selector switches, 211, 212, 213 and 214 are connected as shown to the binary counters. These switches decode the binary signal levels to digital signals and provide zero output when the binary count equals the count (0 to 9) set on the respective switch 211, 212, 213 or 214. NOR gate 216 provides a zero output until each output from selector switches 211, 212, 213 and 214 is satisfied by the binary coded decimal decodes 206, 207, 208 and 209. Thus, a zero level to all inputs to NOR 216 is achieved. When this occurs, the output of NOR 216 changes from zero to one. Element 217 is a one-shot or mono-stable multi-vibrator which provides an output pulse of a predetermined duration, depending upon the values of the circuit components selected regardless of the duration of the input pulse. The operation of this device is well known to those familar with the art. The output pulse of element 217 is used by reset line 228 to reset binary coded decimal decodes 206, 207, 208 and 209 to "0000" and to provide a pulse to the NOR gate 108 for activating motor 23 as in the original embodiment. If element 217 were not included in the circuitry, this pulse which is derived through the counter total equalling the total set in switches 211, 212, 213, 214 and 215, would reset the counter to "0000" and would turn off before it could accomplish other functions.

The operation of the remainder of the circuitry proceeds as previously described, it being noted that in view of the increased speed of the disc 25, the spacing of the dwell slots 33 will have to be rechosen. Alternatively, if desired, a similar counter to that shown in FIGURE 12 could be placed between light sensitive switch 116 and NOR gate 118 to adjustably relate the rate of the light pulses received by light sensitive switch 116 to the desired rate of pulses to control the "dwell" period through NOR gate 118.

Thus, it is obvious that the switch settings can in the alternative embodiment of FIGURE 12, provide adjustable pulse rates from the single disc 25 for various programs. As an example, it can be assumed that the disc has 1200 holes adjacent to its circumference, and that there is a 20:1 gear ratio between the mandrel and the disc. Therefore, as a result of this, there are effectively 20×1200=24,000 pulses per revolution of the mandrel as the input to the frequency divider. Also, it can be assumed that the desired program for a product requires 120 pulses per mandrel revolution. In order to obtain this, the counter setting is determined by the formula:

$$\text{Counter Setting} = \frac{\text{Number of Pulses per Revolution at Input}}{\text{Number of Pulses Desired}}$$

or $$\text{Counter Setting} = \frac{24{,}000}{120} = 200$$

In a further alternative of the electronic circuitry, a binary coded decimal counter may be used to control the reversing of the winder head 18 in place of limit switches 27R and 27F. In such alternative, pulses which are derived by light sensitive switches 106 or 116, with a direct driven mandrel, or using the alternative of FIGURES 11 and 12 are fed through wave shaping and amplifier circuitry to a standard binary coded decimal decade counter in parallel to those pulses which are fed to pulse motor 23. The circuitry to achieve this result is shown in FIGURE 13. In this alternative, adjustable present digital selector switches, connected to the counter, control the number of pulses which are fed to the motor before it reverses its direction. Thus, the length of travel of the winder head is controlled. This eliminates the necessity of manually and mechanically setting the limit switches at the extreme ends of the winder head travel and provides a simple switching means to adjust the length of travel. Also, since each pulse is counted, dwell time may be programmed by another set of selector switches, set to a desired value.

The pulse motor 23 will rotate as dictated by the pulses with which it is being fed until the counter, being fed by these same pulses, reaches a value equal to the value set on the length selector switches. Under this condition, a pulse from the length selector switch circuitry conditions the control circuitry to block further pulses from reaching the pulse motor 23 and, hence, the motor stops and dwells. At this time, the counter resets to "0000" and continues counting these same pulses now blocked to the motor. When the counter value equals the number set into a separate set of dwell selector switches, another pulse is generated. This pulse reverses the direction and dwell controlling circuitry for the pulse motor 23 and unblocks it. In this manner the winder head has traversed in one direction for a number of pulses equal to the length preset, stopped for a number of pulses equal to the dwell present, started in the reverse direction again to traverse for a number of pulses equal to the length preset. This sequence of action continues until the machine is stopped.

The circuitry to accomplish these sequences is shown in FIGURE 13.

The binary counter comprises digit binary coded decimal counter elements 406 (units), 407 (tens), 408 (hundreds) and 409 (thousands) combined with special selector switches 411 to 414. The operation of the binary counter in FIGURE 13 is identical to that shown in FIGURE 12 with:

Element 406 being identical to element 206;
Element 407 being identical to element 207;
Element 408 being identical to element 208, and so on with element 414 being identical to element 214.

The functioning of the dwell and directional circuitry is similar to that described in the original application, except where, as described herein, the pulse output from the counter described is used to adjustably control the dwell period.

Referring to FIGURE 13, the operation of any element on this drawing, numbered 100–199, is, as previously described, described in the original application. The numbers above 300 refer to new elements used in this embodiment and to their relationship to other described phases.

In order to follow the logic operation, it can be assumed that the output of dwell flip-flop 120 is zero at terminal 122 and one at terminal 126, and that output of forward/reverse flip-flop 128 is zero at terminal 131 and one at terminal 1312. A manually operable switch 315 is in the "One" position. Furthermore, switches 411–414 are set at "0100" and switches 303 and 304 at "10".

When the mandrel starts to rotate, pulses are generated and appear at forward/reverse NOR 110 and 111, as described in the original application. Since terminal 122 is at "0" and terminal 131 is "0," the pulses are not blocked in NOR 110 and are fed to the pulse motor which starts to rotate in the forward direction. Because terminal 130 is "1," pulses are blocked in the reverse NOR 111. These same pulses are also fed from element 108 to inverter NOR 301, which provides the counter with pulses of the correct polarity. Each time the output of NOR 301 goes from "0" to "1," the counter decade 406 registers the count. When the counter has reached "10" and thereby equals the value of presets 303 and 304, their putputs go to "0." Two of the three inputs to NOR 306 are "0." The remaining input is connected to terminal 126 of dwell flip-flop 120 which is "1" at this time. Nothing happens to the output of NOR 306 at this time and it remains "0." The counter continues to count beyond the value in selector switches 303 and 304 in step with the aforementioned pulses and, hence, the motor also keeps stepping in synchronization. This continues until the counter reaches "0100," which is the value set in switches 411–414. The outputs, and hence four of the five inputs to NOR 305, go to "0." The remaining input is connected to terminal 122 of the dwell flip-flop 120. However, at this time a steady "1" level appears at off-input 313, dictating a "0" output from NOR 312 and a "1" output from NOR 313 which is also "0." Therefore, all five inputs to NOR 305 are at "0." Under this condition, the output of NOR 305 changes from "0" to "1." This signal is fed to the on-input NOR 312, which is employed with NOR 313 to form a latch whose operation is well known to those familiar with the art. Also, it is fed to NOR 307.

When the input to NOR 312 from NOR 305 goes from "0" to "1," its output tries to go from "1" to "0" and would remain at this level until turned off by a pulse to the off-input of NOR 313. As previously described, output of NOR 306 at this time is "0." This output forms an input to NOR 307. The remaining input to NOR 307 from NOR 305 changes from "0" to "1." Now output of NOR 307 changes from "1" to "0." This signal is inverted by NOR 309 and a "0" to "1" signal is fed to a single-shot 311, whose operation is similar to that of one shot 217.

Terminal 317 of single-shot 311 goes from "0" to "1" and terminal 318 goes from "1" to "0." This latter signal from terminal 318 is fed through switch 315 to input of NOR 302. The output of NOR 302 changes from "0" to "1" and this signal is fed to the reset line of the counter. Thereby, the counter is reset to "0000." When the signal from terminal 317 goes from "0" to "1," nothing happens to dwell flip-flop 120, as previously explained in relation to FIGURE 9. After a period of time and depending upon the component values selected for the single-shot 311, its output goes from "1" to "0." This signal changes the state of the dwell flip-flop 120. Terminal 122 goes from "0" to "1" and terminal 126 goes from "1" to "0." The signal on terminal 126 is connected to the input of forward reverse flip-flop 128. The input signal, going from "1" to "0," changes the state of flip-flop 128 and, therefore, terminal 130 goes from "1" to "0," while terminal 131 goes from "0" to "1." Terminal 122 puts a "1" level on one of the inputs of NOR 305 and a "1" level on inputs of NOR 110 and 111. Terminal 126 is connected to off-input of NOR 313 and one of the inputs to NOR 306 which are now at "0" level. This removes the off-hold input of the latch combination NOR 312 and 313. However, since there is no on-input at this time, the latch does not operate.

The "0" level at terminal 130 of forward reverse flip-flop 128 is connected to one input of NOR 111 and the "1" level at terminal 131 is connected to one input of NOR 110. The counter has now been reset and continues to count the pulses which are still being generated from NOR 108. However, at least one input of each of NOR 110 and 111 is at a "1" level, this blocking the pulses from being fed through either the forward or reverse lines to the pulse motor 23. Since the motor is not moving, the winder head is in a dwell condition.

When the counter elements 406, 407, 408 and 409 have advanced so that their total equals "10," which is the number set on switches 303 and 304, all inputs to NOR 306 go to "0." On this condition, the output of NOR 306 changes from "0" to "1," putting a "1" level on one input of NOR 307 where previously all inputs had been "0."

On this occurrence, the output of NOR 307 goes from "1" to "0," and the output of NOR 309 and the input of single-shot 311 goes from "0" to "1." As previously explained, the counter resets to "0000" and, after the single-shot 311 has timed out and after terminal 317 goes from "1" to "0," dwell flip-flop 120 changes state. Terminal 122 goes from "1" to "0" and terminal 126 goes from "0" to "1." The "0" to "1" shift at the input to forward reverse flip-flop 128 does not change its state. The other output of terminal 126 puts a "1" level on one of the inputs of NOR 306. Terminal 122, now at "0," puts a "0" level on one input of NOR 305 and on one input of each of NOR 110 and 111. NOR 110 has one input at a "1" level, while NOR 111 has two inputs at "0" and while the other input is pulsed from NOR 108. The pulses from the pulse generator are blocked by the forward NOR 110 but not from the reverse NOR 111. Therefore, the pulse motor now rotates in the reverse direction.

In summary, the following sequences occur:

(1) The pulse motor 23 has advanced a number of pulses equal to number of pulses dialed into present No. 1 (switches 411–414) in the forward direction.

(2) The pulse motor 23 has stopped for a number of pulses equal to the number set into preset No. 2 (switches 303 and 304).

(3) The pulse motor 23 has started in the reverse direction and will advance as in item No. 1, and will continue unless the sequence is stopped.

Length of travel and dwell have been determined by preset switches and the binary coded decimal counter.

The length preset can also be used with the dwell determination by two successive holes in track No. 2 of disc 25, as shown in the original application. But again, limit switches 27R and 27F are eliminated.

For this purpose, manually operated switch 315 is transferred to position No. 2. This locks out the dwell preset elements 303, 304 and 306 and reset elements 307 and 309. Also, it activates latch combination 312 and 313, and reset elements 308 and 310. The operation of latch elements hae been explained previously. The operation of reset elements 308 and 310 are the same as that of reset elements 307 and 309, but now have different inputs controlled by the latch. Operation in this mode can be followed by the same functioning as previously explained.

Summarizing, the sequential occurrences are as follows:

(1) The pulse motor 23 has advanced a number of pulses equal to the number established in preset No. 1 (switches 411–414) in the forward direction.

(2) Track No. 2 is activated and the pulse motor 23 continue to operate until the first hole in this track is sensed.

(3) The pulse motor 23 stops until the second hole in track No. 2 is sensed.

(4) The pulse motor 23 starts in the reverse direction and continues to rotate as in item No. 1.

The pulse motor, as indicated above, moves a positive 1.8° of revolution per pulse of power input, that is, it requires 200 pulses to turn the rotor 360°. Pulse motor 23 supplies power to the traverse head through pulley 24, and it will be apparent that the speed of the traverse head can be varied by changing the circumference of pulley 24. Concerning speed, it will be apparent if the pulley 24 is, say 6 inches in circumference, each pulse will move the traverse head a distance equal to 6 inches divided by 200, i.e. .030 inch.

As is well known in the art, the speed of traverse is a function of the permissible speed of feed of the filament. If the diameter of the mandrel 12 that is being wound is large, it will take up filament faster than if the diameter is small for a given r.p.m. of the mandrel. Thus, there is a need to operate at slower mandrel speeds for large mandrel diameters than at small mandrel diameters and the traverse speed must be adjusted accordingly. A filament feed speed of about 150 feet per minute is considered fast. With a given filament feed speed, the traverse rate will be relatively slow for larger diameters; the traverse rate will be faster for small diameters. With this invention traverse rate can be easily varied by means of changing pulley 24. The traverse head is capable of traversing a mandrel of any reasonable traverse length at any speed required in winding practice.

The motor 23, which is the prime mover of the traverse means, moves only by predetermined and positive increments in response to power pulses supplied thereto so that the travel of the winder head back and forth across the mandrel is without accumulative error. Thus the only error in the traverse means is due to the slack in the drive from the motor 23 to the traverse head 18. This error would not accumulate with each movement forward of the motor 23. It would occur only once. The incremental movement of the motor is positive and without error. The predetermined movement depends only on whether or not a pulse is received and the pulse sequence is in turn related to the rotation of the mandrel.

What I claim as my invention is:

1. A filament winding machine comprising: a frame, a mandrel mounted for rotation in said frame, a filament winder head, power train means for rotating said mandrel to take up a filament from said winder head, operating means for moving said winder head with respect to said mandrel, said operating means including traverse means having a traverse prime mover and means for transmitting the movement of said prime mover to said winder head, said traverse prime mover being a pulse motor adapted to rotate predetermined positive increments in response to digital input power pulses whereby to cause said winder head to traverse back and forth with respect to said mandrel without accumulative error in response to a series of said digital power pulses supplied to said traverse prime mover, programming means for supplying said digital power pulses to said traverse prime mover whereby to dictate the operation of said traverse prime mover, said programming means being adapted to supply input power pulses to said traverse prime mover in predetermined time sequence and at predetermined different rates whereby to dictate the operation of said traverse prime mover to cause said winder head to traverse and dwell with respect to said mandrel according to a predetermined pattern, said programming means including signal transmitting means related to the movement of said power train means that rotates said mandrel to control the time sequence of said power pulses to said traverse prime mover.

2. A filament winding machine as claimed in claim 1, in which said signal transmitting means has a first band for transmitting signals that control the time sequence of said power pulses to said traverse prime mover in a period of motion and a second band for controlling signals that control power pulses to said traverse prime mover in a period of dwell and means for changing from said first band to said second band.

3. A filament winding machine as claimed in claim 2, in which said signal transmitting means is a rotatably mounted disk, and said first band is a first series of light transmitting holes in said disk, and said second band is a second series of holes in said disk.

4. A filament winding machine as claimed in claim 1, in which said signal transmitting means has a plurality of bands for transmitting signals that control the time sequence of said power pulses to said traverse prime mover, each of said bands being adapted to control a different phase of movement of said winder head with respect to said mandrel, said signal transmitting means including means for selecting said bands according to a predetermined program.

5. A filament winding machine as claimed in claim 4, in which said signal transmitting means is a rotatably mounted disk and each of said plurality of bands comprises a separate series of light transmitting holes on said disk.

References Cited

UNITED STATES PATENTS

| 2,757,884 | 8/1956 | Bryant et al. | 242—158 |
| 3,128,956 | 4/1964 | Schumann | 242—158.4 |

FOREIGN PATENTS

| 1,358,076 | 3/1964 | France. |

NATHAN L. MINTZ, *Primary Examiner.*